J. O. ROOT.
GARDEN TOOL.
APPLICATION FILED SEPT. 12, 1917.
1,261,626.
Patented Apr. 2, 1918.
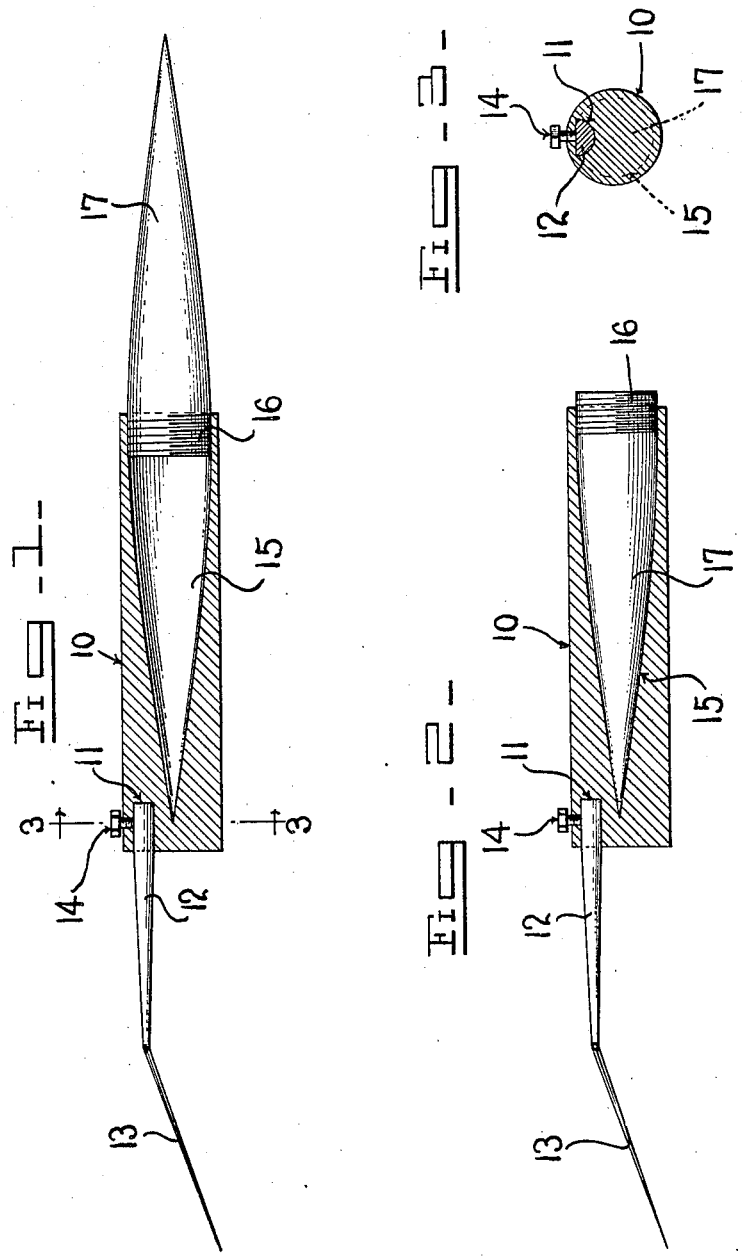
Inventor
John O. Root
Witness
L. B. James
T. L. Mochane
By Victor J. Evans
Attorney

UNITED STATES PATENT OFFICE.

JOHN O. ROOT, OF NOVI, MICHIGAN.

GARDEN-TOOL.

1,261,626.  Specification of Letters Patent.  Patented Apr. 2, 1918.

Application filed September 12, 1917. Serial No. 191,036.

*To all whom it may concern:*

Be it known that I, JOHN O. ROOT, a citizen of the United States, residing at Novi, in the county of Oakland and State of Michigan, have invented new and useful Improvements in Garden-Tools, of which the following is a specification.

This invention relates to garden tools and aims to provide a tool which may be used for the double purpose of weeding and transplanting. To this end the invention provides a handle to which is removably secured a knife blade, which forms a weeding tool, the handle being hollow and having removably secured at its opposite end a punch or dibbler for use in punching a hole in the ground when transplanting.

The invention also provides means whereby the punch or dibbler may be secured within the handle so as not to interfere with the use of the invention as a weeder.

The invention further consists of the following novel combination and arrangement of parts, hereinafter more fully described and illustrated in the accompanying drawings, in which—

Figure 1 is a longitudinal sectional view of the invention;

Fig. 2 is a similar view showing the punch or dibbler housed within the handle; and Fig. 3 is a transverse sectional view on the line 3—3 of Fig. 1.

In the practical embodiment of the invention, there is provided a handle 10, which is preferably cylindrical in shape and is provided at one end with a semi-cylindrical socket 11, which is adapted to receive a semi-cylindrical shank 12 and a knife blade 13. This blade is adapted to be removably secured within the socket 11 by means of the set screw 14 and when in such position may be conveniently used for weeding.

The handle 10 is hollow, being provided with a tapered opening 15, the open end of which is opposite the end having the socket 11. The entrance of the tapered socket 15 is threaded, for engagement with the threaded end 16 of the tapered punch or dibbler 17, which is adapted for use in punching holes in the ground for transplanting or other purposes. When not in use, the punch or dibbler 17 may be housed within the handle 10, by removing and reversing the same, the threads 16 engaging the threads at the entrance of the tapered opening 15 to hold the punch in this position.

From the foregoing description when taken in connection with the accompanying drawings, it will be seen that the invention provides a simple and efficient combination of tools, which may be used either for the purpose of weeding or transplanting. The right is reserved to make such changes in the form and proportion thereof as will fall within the scope of the claims hereto appended.

Having described the invention, what is claimed is:

A tool handle embodying a cylindrical member provided at one end with a socket extending into said member and tapering toward its inner end, threads formed within the outer end of said socket to removably secure a tool, the end of the cylindrical member opposite the threaded end of the socket having an offset socket of relatively smaller size to receive a tool and a set screw entering said last mentioned socket for removably holding a tool in position.

In testimony whereof I affix my signature.

JOHN O. ROOT.

Copies of this patent may be obtained for five cents each, by addressing the "Commissioner of Patents, Washington, D. C."